United States Patent
Paoletti

(10) Patent No.: US 7,069,843 B2
(45) Date of Patent: Jul. 4, 2006

(54) HEATING AND EMULSIFYING DEVICE

(75) Inventor: Luciano Paoletti, Cerchiate Di Pero (IT)

(73) Assignee: SPIDEM S.p.A., Milan (IT)

( * ) Notice: Subject to any disclaimer, the term of this patent is extended or adjusted under 35 U.S.C. 154(b) by 57 days.

(21) Appl. No.: 10/494,861

(22) PCT Filed: Nov. 9, 2001

(86) PCT No.: PCT/IT01/00565

§ 371 (c)(1),
(2), (4) Date: Oct. 7, 2004

(87) PCT Pub. No.: WO03/043472

PCT Pub. Date: May 30, 2003

(65) Prior Publication Data

US 2005/0103211 A1   May 19, 2005

(51) Int. Cl.
A47J 31/44   (2006.01)

(52) U.S. Cl. .................... 99/453; 99/275; 99/323.1

(58) Field of Classification Search ............... 99/275, 99/279–303, 323.1, 323.3, 452–455, 483; 426/433, 423; 261/62, 79.2, DIG. 16, DIG. 76; 366/163, 165, 176
See application file for complete search history.

(56) References Cited

U.S. PATENT DOCUMENTS

| | | | | |
|---|---|---|---|---|
| 3,188,055 A | * | 6/1965 | Lutjens et al. ........... | 366/163.2 |
| 3,854,700 A | * | 12/1974 | MacManus ............... | 366/176.1 |
| 4,715,274 A | * | 12/1987 | Paoletti ........................ | 99/454 |
| 4,735,133 A | * | 4/1988 | Paoletti ........................ | 99/454 |
| 4,779,519 A | | 10/1988 | Giuliano | |
| 4,949,631 A | * | 8/1990 | Fregnan ....................... | 99/452 |
| 4,993,756 A | * | 2/1991 | Bechu ......................... | 285/319 |
| 5,189,949 A | * | 3/1993 | Apa ............................. | 99/453 |
| 5,509,349 A | * | 4/1996 | Anderson et al. .......... | 99/323.1 |

FOREIGN PATENT DOCUMENTS

| DE | 39 02 281 C1 | 6/1990 |
|---|---|---|
| EP | 0 195 750 A2 | 9/1986 |
| EP | 0 919 176 A1 | 6/1999 |

* cited by examiner

Primary Examiner—Timothy F. Simone
(74) Attorney, Agent, or Firm—Hogan & Hartson LLP

(57) ABSTRACT

A heating and emulsifying device (10), particularly for heating and optionally emulsifying air and milk in milk-based products and having the capability to regulate the air-flow and the milk-flow jointly and proportionally, comprises an emulsification chamber (12) having an opening (14) for the delivery of the product and a steam-inlet duct (20) which opens into the emulsification chamber (12). A milk-inlet duct (28) and an air-inlet duct (30) communicate with the steam inlet duct (20), the air and the milk being drawn in by the partial vacuum created by the flow of steam. An air-flow regulator (38) and a milk-flow regulator (40) are operatively associated with the air-inlet duct (30) and with the milk-inlet duct (28), respectively, the air-flow and milk-flow regulators being structurally connected and being suitable for varying the respective flow-rates in proportion with one another and the emulsion/milk ratio in the final product, without affecting its temperature.

22 Claims, 5 Drawing Sheets

Figure 1:
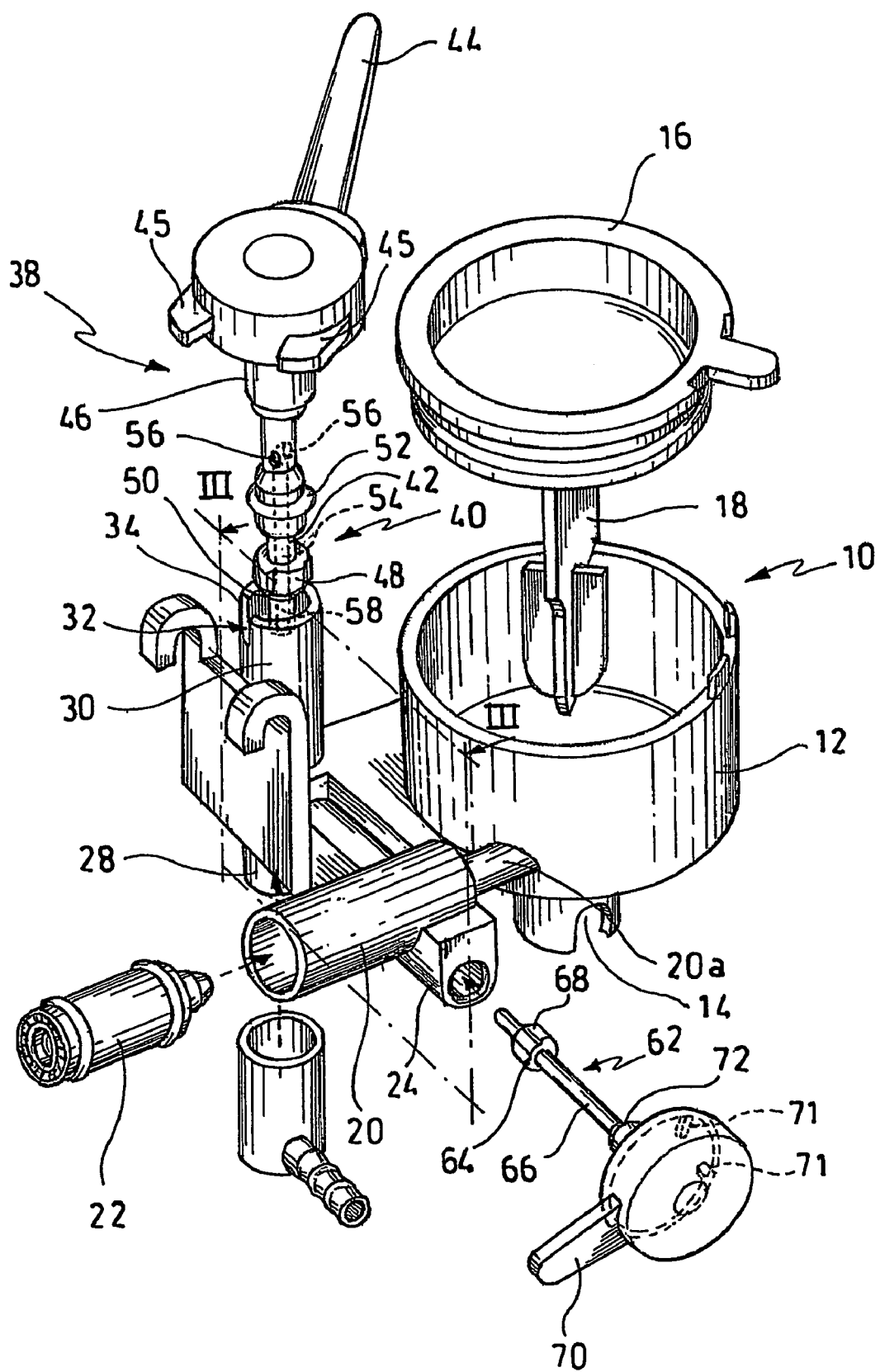

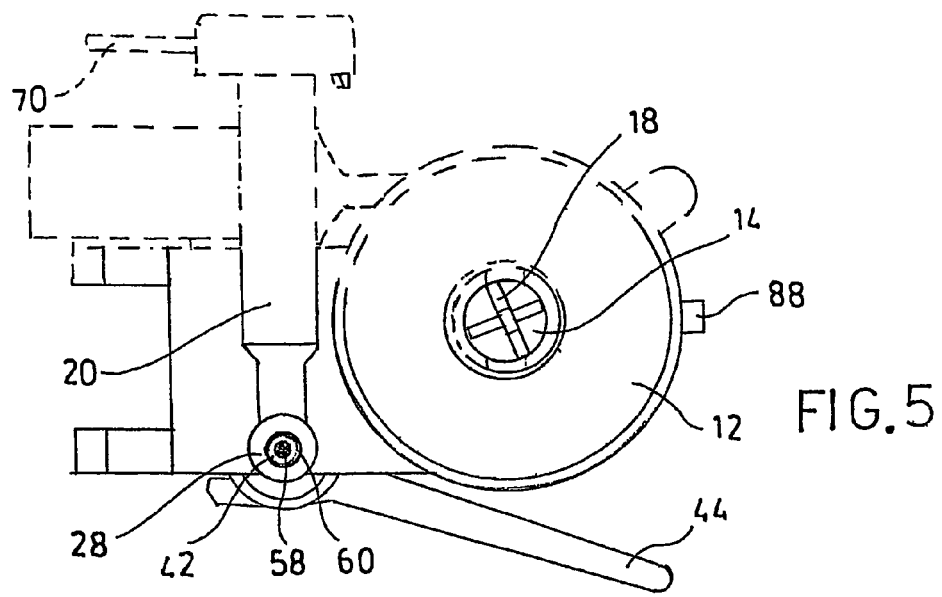
FIG.5
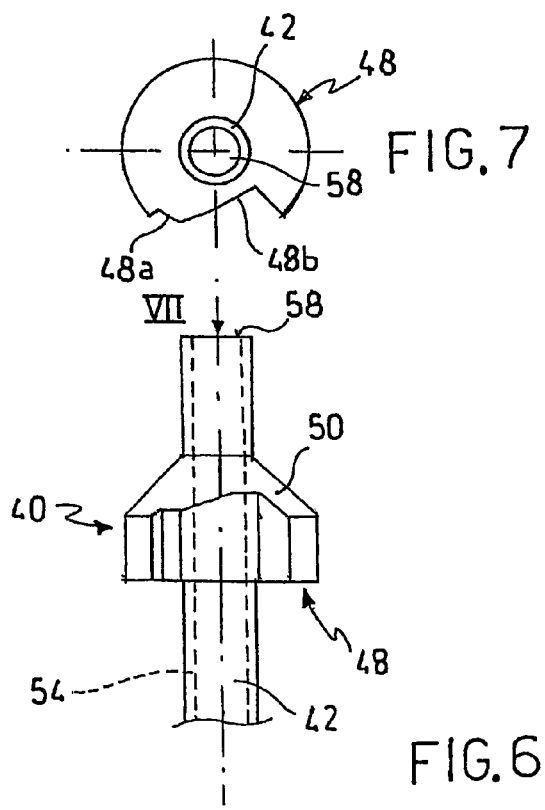
FIG.7
FIG.6
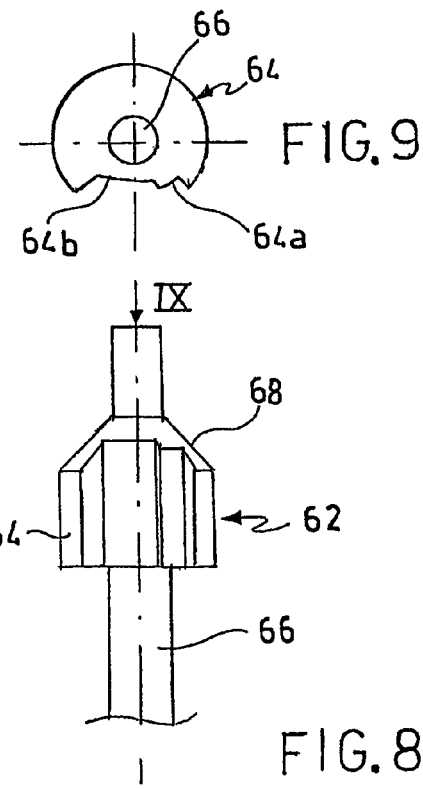
FIG.9
FIG.8

HEATING AND EMULSIFYING DEVICE

The subject of the present invention is a heating and emulsifying device, in particular for heating and optionally emulsifying air and milk in milk-based products, comprising the characteristics of the preamble to claim 1.

The purpose of the device is to heat milk-based hot beverages, for example, cappuccino, and optionally to produce a predetermined percentage of dense and homogeneous foam which is typical of such beverages.

The present invention relates to an emulsifying device particularly to be fitted on machines for producing coffee and cappuccino, both for domestic use and for use in restaurants.

Heating and emulsifying devices comprising the characteristics of the preamble to claim 1, as described, for example, in EP 195750 are known.

Although this device enables air and milk to be emulsified to produce a foam, it does not enable the quantity of air and milk and/or the temperature of the product obtained to be regulated.

In particular, there is a great need to regulate the air flow-rate and hence the emulsion/liquid (milk) ratio in the product obtained, without affecting the temperature of the product or, in particular, the amount of liquid contained therein.

There are, in fact, known heating and emulsifying devices which enable the flow of air and/or milk to be regulated but which have the disadvantage of not allowing a predetermined temperature to be maintained.

In addition to the above-mentioned disadvantage, in attempting to satisfy the above-mentioned need or, more generally, in attempting to regulate the flow of air and/or of milk, considerable difficulties have been encountered in connection both with problems of blockages of the inlet ducts and with problems in maintaining the very tight tolerances in the machining of the parts.

In particular, because of the dimensions and of the minimal tolerances, the known devices in which air-flow and milk-flow regulation is attempted cannot ensure uniform operation over time. In addition to the above-mentioned disadvantage, a uniform dimensional result cannot be ensured over time in the production of the known devices.

The object of the present invention is to devise and to provide a heating and emulsifying device which can satisfy the above-mentioned need and which, at the same time, prevents the problems discussed above.

This object is achieved by means of a heating and emulsifying device of the type specified above, characterized in that it comprises an air-flow regulator and a milk-flow regulator, operatively associated with the air-inlet duct and with the milk-inlet duct, respectively, the air-flow and milk-flow regulators being structurally connected and being suitable for varying the respective flow-rates and the emulsion/milk ratio in the final product, without affecting its temperature.

This object is also achieved by a heating and emulsifying device in which a regulator for regulating the flow of the product, and hence its temperature, is also provided and is interposed between the air-flow and milk-flow regulators and the steam-inlet duct, the product-flow regulator being structurally independent of the air-flow and milk-flow regulators.

Figure 2:
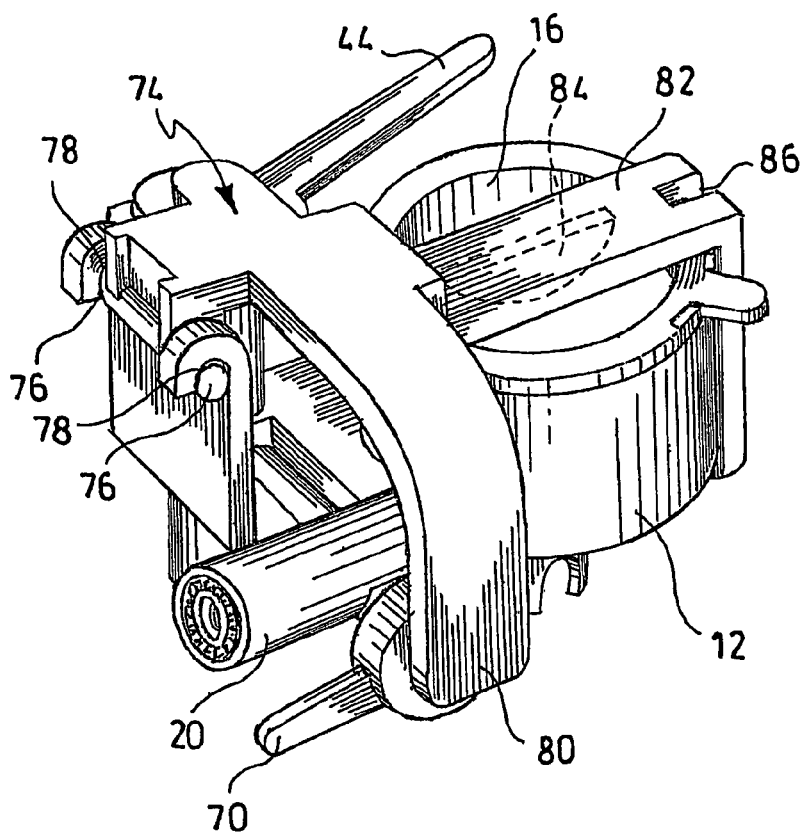
Figure 3:
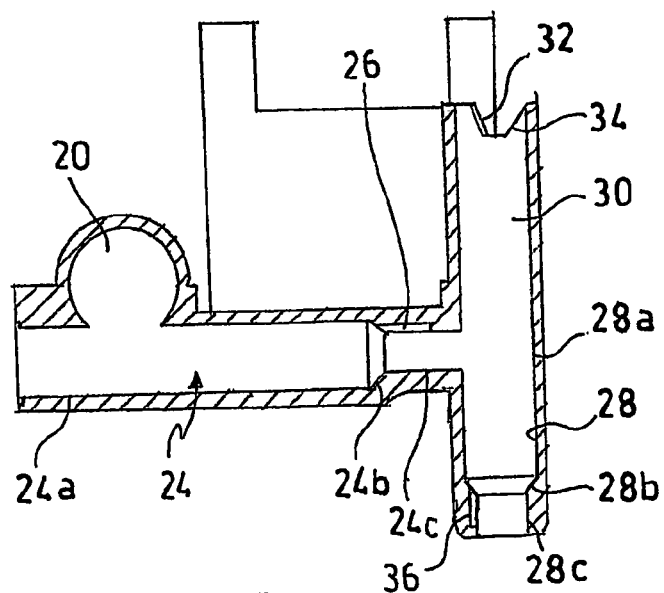
Figure 4:
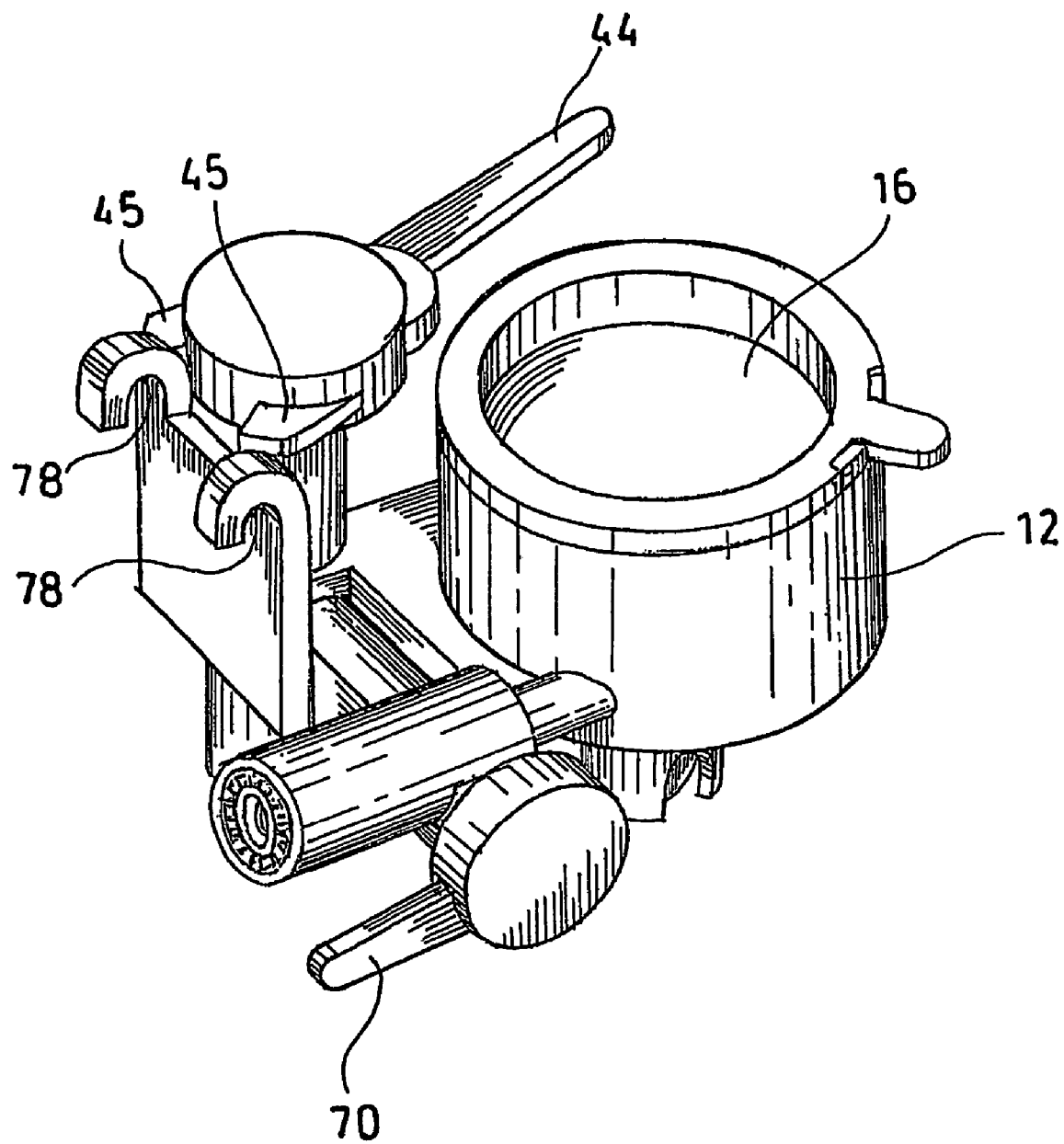
Figure 10:
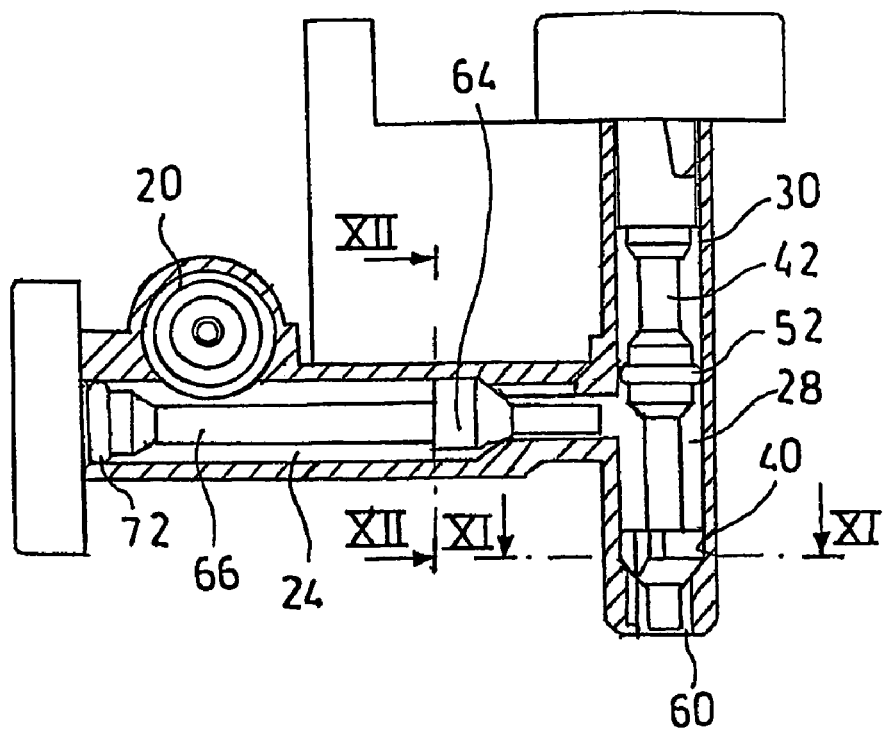
Figures 11, 12:
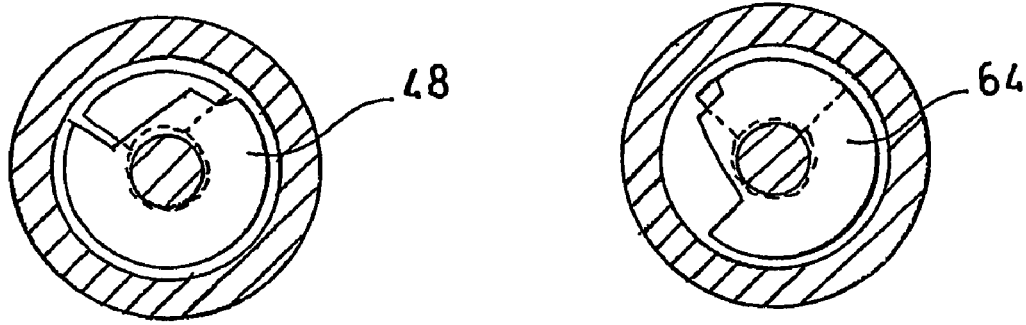

Further characteristics and the advantages of the heating and emulsifying device according to the invention will become clear from the following description of a preferred embodiment thereof, given by way of non-limiting example with reference to the appended drawings, in which:

FIG. 1 is an exploded, perspective view of the emulsifying device according to the invention, FIG. 2 is a perspective view of the device of FIG. 1 assembled, FIG. 3 shows a detail of the device of FIG. 1, sectioned on the line III—III, with some elements omitted in order to show others, FIG. 4 shows the device of FIG. 2, from which a detail has been omitted in order to show others, FIG. 5 is a partial view of the device of FIG. 1 from below, FIG. 6 is a front view of a detail of FIG. 1, FIG. 7 is a view of the detail of FIG. 6, taken along the line VII, FIG. 8 is a front view of a detail of FIG. 1, FIG. 9 is a view of the detail of FIG. 8, taken along the line IX, FIG. 10 shows the section of FIG. 3, with some of the elements constituting the device mounted therein, FIG. 11 shows the device of FIG. 10, sectioned on the line XI—XI, and FIG. 12 shows the device of FIG. 10, sectioned on the line XII—XII.

With reference to the above-mentioned drawings, a heating and emulsifying device, in particular for emulsifying air and milk, for use in machines for producing products such as hot milk-based beverages, for example, cappuccino, hot chocolate and the like, is generally indicated 10.

The device comprises a cylindrical emulsification chamber 12 with a frustoconical base from which the product flows out to the exterior through a delivery opening 14.

The emulsification chamber 12 is closed at the top by a cover 16 having an appendage 18 which is inserted through the delivery opening 14 when the cover is fitted on the chamber 12.

A steam-inlet duct 20 opens into the emulsification chamber 12 and is arranged along an axis substantially tangential to the emulsification chamber.

A nozzle 22 communicating with a steam source, which is not shown since it is of conventional type, is fitted inside the steam-inlet duct 20. The steam-inlet duct 20 and the nozzle 22 are of substantially conventional type, as described and illustrated, for example, in the patent EP 195750 which is incorporated herein by reference.

A duct, indicated 24, through which the product can flow, is arranged tangentially relative to the steam-inlet duct 20 and is perpendicular to the axis along which the steam-inlet duct extends.

Along a longitudinal section, starting from the steam-inlet duct 20, the flow duct 24 has a first cylindrical portion 24a, followed by a portion 24b which is tapered frustoconically to reach the diameter of a second cylindrical portion 24c of smaller diameter than the first cylindrical portion 24a.

A recess 26 formed in the frustoconical portion 24b and in the cylindrical portion 24c defines an aperture through which the product can flow towards the emulsification chamber 12.

A milk-inlet duct and an air-inlet duct, indicated 28 and 30 respectively, are put into communication with the steam-inlet duct 20 by the product flow-duct 24. In particular, in the embodiment shown in the drawings, the milk-inlet duct 28 and the air-inlet duct 30 are disposed at one end of the product-flow duct 24, perpendicular thereto.

In the embodiment shown in the drawing, the milk-inlet duct 28 and the air-inlet duct 30 may be arranged coaxially relative to one another, as continuations of one another. The air and the milk are drawn through the respective inlet ducts until they reach the emulsification chamber 12, in conventional manner, because of the partial vacuum created by the flow of the steam along an end portion 20a of the steam-inlet duct.

The free end of the air-inlet duct has a channel or notch 32 defined by at least one wall 34 which is inclined to the axis along which the air-inlet duct 30 extends.

Along a longitudinal section of the milk-inlet duct 28, starting from the point at which it is in communication with the product-flow duct 24, the milk-inlet duct 28 has a first cylindrical portion 28a followed by a portion 29b which is tapered frustoconically to reach the diameter of a second cylindrical portion 28c of smaller diameter than the first cylindrical portion 28a.

A recess 36 formed in the frustoconical portion 28b and the cylindrical portion 28c defines an aperture for the flow of the milk drawn in by the steam flow.

An air-flow regulator or choke, indicated 38, and a milk-flow regulator or choke, indicated 40 are operatively associated with the air-inlet duct, choked by the notch 32, and with the milk-inlet duct, respectively.

The two above-mentioned regulators are connected structurally, for example, in a single body and can jointly regulate the air-flow and the milk-flow so as to vary the emulsion/milk ratio in the product to be produced without changing the temperature of the product.

In fact, both the milk-flow regulator 40 and the air-flow regulator 38 are associated with a single support 42 which is fitted in the air-inlet duct 30 and in the milk-inlet duct 28 so as to provide for a progression of the milk flow-rate which is substantially proportional to the increase in the air flow-rate, thus maintaining a predetermined temperature of the product, as will be described below, but varying the ratio between the quantity of emulsion and the quantity of liquid (milk).

In the embodiment shown in the drawing, the support 42 may advantageously be produced in the form of a rod which can be fitted coaxially in the air-inlet and milk-inlet duct. An end of the rod is connected to a control lever 44 which extends perpendicular to the support 42, outside the air-inlet duct, and which defines a single control that can be operated from the exterior, acting on both regulators 38 and 40 simultaneously. Two stop elements 45 associated with the lever 44 interact with a fixed element of the device 10 in order to define the initial and final travel limits both of the air regulator 38 and of the milk regulator 40.

Moreover, in the embodiment shown in the drawing, the support 42 can rotate about an axis which corresponds to the axis along which both the air-inlet duct and the milk-inlet duct extend, in order to vary the air-flow and the milk-flow jointly.

As the air-flow varies from a zero flow to a maximum value, the milk-flow also varies automatically from a minimum value to a maximum value. Consequently, the ratio between the emulsion and the milk in the final product varies but the temperature does not change.

The air-flow regulator 38 comprises means for continuously varying the degree of opening of a flow aperture defined along the air-inlet duct 30. This aperture is defined substantially by the interaction between the channel 32 and a slight recess 46 formed in the support 42, for example, by slight flattening of the outer cylindrical surface of a portion of the support.

In particular, the recess 46 interacts with the inclined wall 34 of the channel 32, thus defining an air-flow aperture having dimensions which can vary as the angular position of the support 42 varies.

The milk-flow regulator 40 also comprises means for continuously varying the degree of opening of a flow aperture defined along the milk-inlet duct 28.

In the embodiment shown in the drawing, the milk-flow regulator may comprise a stepped disk 48 having a profile which varies in a plane perpendicular to the axis along which the milk-inlet duct 28 extends (FIG. 6).

The stepped disk 48 is associated with the support 42, rotating together therewith as a result of the operation of the lever 44 and interacting with the milk-flow aperture defined along the milk-inlet duct by the recess 36.

The stepped disk 48 comprises, in a plane perpendicular to the axis along which the support 42 extends (FIG. 7), a first portion 48a with limited profile variation and a second portion 48b with marked profile variation.

A frustoconical surface 50 associated with the stepped disk 48 can bear against the corresponding surface of the frustoconical portion 28c defined along the milk-inlet duct 28 (FIG. 10).

A sealing means, indicated 52, mounted on the support 42, is interposed between the air-flow regulator 38 and the milk-flow regulator 40. The sealing means 52 is formed, for example, by a ring of resilient material fitted on the rod constituting the support 42.

In addition to the parts described above, the support 42 comprises an air-flow duct 54 which connects the air-inlet duct to the milk-inlet duct, bypassing the sealing means 52.

The air-flow duct 54 formed in the support 42 in fact has at least one inlet opening 56 and at least one outlet opening 58 which are arranged upstream and downstream of the sealing means 52, respectively, in the direction of the air-flow, as will be indicated below.

In the vicinity of the outlet opening 58, the support 42 also has an end which can be fitted in the milk-inlet duct 28, leaving a space 60 the dimensions of which are smaller than the dimensions of the milk-flow aperture in the duct (see FIG. 5). In other words, the dimensions of the end of the support 42 are such as to constitute a filter at the end of the milk-inlet duct 28 so as to prevent impurities larger than a predetermined dimension from entering the milk-inlet duct and blocking its flow aperture.

In addition to the parts described above, a regulator 62 for regulating the flow of the product and hence its temperature, is interposed between the air-flow and milk-flow regulators 38 and 40 and the steam-inlet duct 20. In particular, the product-flow regulator 62 is inserted along the product-flow duct 24 and is structurally independent of the air-flow and milk-flow regulators 38 and 40 in order to regulate the product flow without affecting the emulsion/milk ratio defined by the regulators 38 and 40.

The term "product" means purely milk, or milk with air/milk emulsion coming from the ducts 28 and 30. As will be explained further below, it is purely milk when the air-inlet opening is closed, whereas it is milk and emulsion in variable ratios, according to the degree of opening of the air-inlet (to which a degree of opening of the milk inlet proportionally corresponds).

The product-flow regulator 62 also comprises means for continuously varying the opening of a flow aperture defined along the flow duct 24.

As shown in the drawings, the product-flow regulator 62 may comprise a variable-profile stepped disk 64 associated with a support 66 in the form of a rod inserted coaxially along the product-flow duct 24 (FIG. 8).

The stepped disk 64 interacts with the product-flow aperture defined by the recess 26, along the product-flow duct 24.

As shown in FIG. 9, the stepped disk 64 may comprise a first portion 64a with limited profile variation and a second portion 64b with marked profile variation.

A frustoconical surface 68 associated with the stepped disk 64 can bear against a corresponding surface of the frustoconical portion 24c defined along the product-flow duct 24 (see FIG. 10).

The support 66 also extends from the product-flow duct 24 and terminates in a lever 70 which acts as a control lever for causing the support 66 to rotate substantially about the axis along which the product-flow duct extends. Two stop elements 71 associated with the lever 70 define the initial and final travel limits of the product-flow regulator 62.

In the vicinity of its end which extends to the exterior, the support 66 has sealing means 72 formed, for example, by a ring of resilient material fitted on the rod which constitutes the support 66.

At its inner end, the support 66 has an end suitable for being fitted in the flow duct 24, leaving a space 60 the dimensions of which are smaller than the dimensions of the product-flow aperture in the duct (see FIG. 10). In other words, the dimension of the end of the support 66 are such as to constitute a filter at the end of the flow duct 24 so as to prevent impurities larger than a predetermined dimension entering the flow duct 24 and blocking its aperture.

Finally, locking means, indicated 74, hold both the support 42 and the support 66 pushed into the respective ducts as well as keeping the cover 16 pressed against the upper opening of the emulsification chamber 12.

The locking means 74 are constituted by two arms in a substantially "L"-shaped arrangement, provided with pins 76 suitable for interacting with seats 78 of a framework of the device 10. A bent arm 80 has an end suitable for interacting with the support 66 in order to urge it into the duct 24 and an end which extends to interact with the support 42 in order to urge it into the ducts 28 and 30. The other arm 82 is bent substantially at 90° and extends over the cover 16 to grasp the walls of the chamber 12 laterally. A projecting element 84 extends from the arm 82 and bears against the cover 16 in order to keep it pressed against the chamber 12. The portion of the arm 82 which is bent along the side wall of the chamber 12 has a slot 86 which interacts with a catch element 88 formed integrally in the side wall of the chamber 12. When the pins 76 are inserted in the seats 78 and the catch element 88 is snap-fitted in the slot 86, the locking means 74 are fitted on the device 10 and hold the cover 16, the support 42 and the support 66 in position.

The operation of a heating and emulsifying device according to the present invention is described below.

The supply of steam through the end portion 20a of the steam-inlet duct generates, in conventional manner, a partial vacuum which draws air and milk through the respective inlet ducts 30 and 28.

Pivoting of the lever 44 achieves a first regulation, that is, it varies the emulsion/milk ratio in the product without varying the temperature of the product and, in particular, of the liquid which it contains.

The initial position, which is defined by the positions of the two stop elements 45 relative to a fixed frame of the device 10, corresponds to the position in which the air-inlet is closed and the milk-flow aperture is partially open, as shown in FIG. 12. For the air-inlet to be closed it suffices for the recess 46 to be offset relative to the notch 32.

This condition corresponds to the production of non-emulsified hot milk.

If the lever 44 is pivoted, the support 42 rotates about its axis which coincides with the axis along which the air-inlet and milk-inlet ducts extend.

As a result of this rotation, the recess 46 interacts with the wall 34 of the channel 32, continuously increasing the air-inlet opening.

The air which enters through the channel 32 passes through the inlet opening 56 and flows out of the outlet opening 58 in the region of the milk inlet. The milk-inlet duct 28 has been so defined for simplicity of explanation but it is clear from the operation of the device as described above that both milk and air already partially dispersed in the milk (emulsion) pass through it.

The pivoting of the lever 44 at the same time brings about rotation of the stepped disk 48, opening the milk-flow aperture proportionally with the opening of the air-flow aperture until the entire cross-section of the recess 36 is free for the milk flow.

This latter condition corresponds to the maximum degree of air emulsified in the milk and hence to the maximum emulsion/milk ratio.

In order to regulate the temperature of the emulsion, once the emulsion/milk ratio has been set, the lever 70 must be pivoted in order to vary the flow-rate of product relative to the flow-rate of steam.

The pivoting of the lever 70 causes the stepped disk 64 to rotate, continuously varying the flow aperture for the product, corresponding to the free cross-section of the recess 26. The stop elements 71 define the minimum and maximum degrees of opening of the product-flow aperture, respectively.

When the desired degree of emulsion and the temperature have been set, the flow of steam through its inlet duct draws air and milk into the emulsification chamber 12 from which the product, optionally emulsified, emerges.

FIGS. 11 and 12 show two positions of the stepped disk 48 and of the stepped disk 64, respectively. FIG. 12 shows the minimum flow-aperture position and, although it relates to the stepped disk 64, also corresponds schematically to the position of the stepped disk 48 when hot milk is to be produced without emulsion. FIG. 11 shows the position of opening of the flow aperture for the milk-inlet duct 28, although it may also be applied schematically to the product-flow duct 24.

As can be appreciated from the foregoing description, the emulsifying device 10 according to the present invention satisfies the above-mentioned need to vary the air-flow and the milk-flow jointly, thus regulating the degree of emulsion progressively from zero to a maximum without affecting the temperature of the product (particularly of the quantity of liquid contained therein). In addition, the device according to the present invention enables the temperature of the product to be regulated independently of the emulsion/milk ratio selected.

A further advantage of the present invention is that it has ducts with flow apertures such as to ensure proper cleanliness of the device. Moreover, by virtue of their shapes and arrangement, the various ducts and the respective regulators of their degrees of opening can be produced by moulds, without movable joints and in a single piece, also avoiding the formation of regions which favour milk deposits and furthermore ensuring that, during the production of the device, there are no dimensional variations, which are particularly dangerous for elements having minimal tolerances.

The device according to the present invention also permits continuous regulation, from a flow purely of milk (air-inlet closed) to a flow of the maximum quantity of air (maximum degree of emulsion).

A further advantage of the device according to the invention lies in its unusual structural simplicity which enables it to be produced at very low cost and with uniformity of operation over the production volume.

Clearly, variations and/or additions may be provided for the embodiment described and illustrated above.

In particular, the shapes of the stepped disks or of the air-flow regulator may be different, as may the shapes and dimensions of the ducts.

In order to satisfy contingent and specific requirements, a person skilled in the art may apply to the above-described preferred embodiment of the emulsifying device many modifications, adaptations and replacements of elements with other functionally equivalent elements without, however, departing from the scope of the appended claims.

The invention claimed is:

1. Heating and emulsifying device, in particular for heating and optionally emulsifying air and milk in a milk-based product, comprising:
   an emulsification chamber having an opening for the delivery of the milk with a predetermined degree of emulsion,
   a steam-inlet duct which opens into the emulsification chamber,
   a milk-inlet duct and an air-inlet duct which communicate with the steam-inlet duct, the air and the milk being drawn in by the partial vacuum created by the flow of steam,
   characterized in that it comprises an air-flow regulator and a milk-flow regulator, operatively associated with the air-inlet duct and with the milk-inlet duct, respectively, the air-flow and milk-flow regulators being structurally connected in a single body and being suitable for jointly varying the respective flow-rates so as to vary the emulsion/milk ratio progressively in the final product without affecting its temperature.

2. Heating and emulsifying device according to claim 1, in which the milk-flow regulator and the air-flow regulator can vary the respective flow-rates in proportion with one another.

3. Heating and emulsifying device according to claim 1 in which the milk-flow regulator and the air-flow regulator are associated with a single support which is fitted in the air-inlet duct and in the milk-inlet duct.

4. Heating and emulsifying device according to claim 3 in which the support is fitted coaxially in the air-inlet and milk-inlet duct.

5. Heating and emulsifying device according to claim 3 in which the support can rotate about an axis in order to vary the emulsion/milk ratio in the product.

6. Heating and emulsifying device according to claim 3 in which the air-flow regulator comprises means for continuously varying the degree of opening of a flow aperture defined along the air-inlet duct.

7. Heating and emulsifying device according to claim 6 in which the means for continuously varying the air-flow aperture comprise a channel or notch formed in the walls of the air-inlet duct and interacting with a recess formed in the support.

8. Heating and emulsifying device according to claim 7 in which the channel is defined by at least one wall which is inclined to the axis of the air-inlet duct.

9. Heating and emulsifying device according to claim 3 in which the milk-flow regulator comprises means for continuously varying the opening of a flow aperture defined along the milk-inlet duct.

10. Heating and emulsifying device according to claim 9 in which the milk-flow regulator comprises a variable-profile stepped disk associated with the support and interacting with the milk-flow aperture defined along the milk-inlet duct.

11. Heating and emulsifying device according to claim 10 in which the variable-profile stepped disk comprises a first portion with limited profile variation and a second with marked profile variation.

12. Heating and emulsifying device according to claim 10 in which a frustoconical surface is associated with the stepped disk and can bear against a corresponding frustoconical surface defined along the milk-inlet duct.

13. Heating and emulsifying device according to claim 1 in which the air-flow regulator and the milk-flow regulator comprise a single control operable from the exterior and acting on both regulators simultaneously.

14. Heating and emulsifying device according to claim 3 in which the support comprises sealing means interposed between the air-flow regulator and the milk-flow regulator.

15. Heating and emulsifying device according to claim 14 in which the support comprises an air-flow duct provided with at least one inlet opening and at least outlet opening which are disposed upstream and downstream of the sealing means, respectively, in the direction of the air-flow.

16. Heating and emulsifying device according to claim 3 in which the support has an end which can be fitted in the milk-inlet duct, leaving a space the dimensions of which are smaller than the dimensions of the milk-flow aperture in the duct.

17. Heating and emulsifying device according to claim 1 in which a regulator for regulating the flow-rate of the product, and hence its temperature, is also provided and is interposed between the air-flow and milk-flow regulators and the steam-inlet duct, the product-flow regulator being structurally independent of the air-flow and milk-flow regulators.

18. Heating and emulsifying device according to claim 17 in which the product-flow regulator comprises means for continuously varying the opening of a flow aperture defined along a product-flow duct interposed between the air-inlet and milk-inlet ducts and the steam-inlet duct.

19. Heating and emulsifying device according to claim 18 in which the product-flow regulator comprises a variable-profile stepped disk associated with a support and interacting with the product-flow aperture defined along the product-flow duct.

20. Heating and emulsifying device according to claim 19 in which the variable-profile stepped disk comprises a first portion with limited profile variation and a second portion with marked profile variation.

21. Heating and emulsifying device according to claim 19 in which a frustoconical surface is associated with the stepped disk and can bear against a corresponding frustoconical surface defined along the product-flow duct.

22. Heating and emulsifying device according to claim 1 in which the air-flow regulator and the milk-flow regulator are formed in a single body.

* * * * *